United States Patent
Bodenheimer

[15] 3,650,416
[45] Mar. 21, 1972

[54] VEHICLE CARRIER
[72] Inventor: Bert A. Bodenheimer, Stamford, Conn.
[73] Assignee: Sea-Land Service, Inc., Elizabeth, N.J.
[22] Filed: Jan. 22, 1970
[21] Appl. No.: 4,972

[52] U.S. Cl. ..........................214/10.5 R, 105/367, 220/1.5, 220/97 R, 280/33.99 T, 296/1 A
[51] Int. Cl. ...........................................B65g 1/14
[58] Field of Search ..................214/10.5; 296/1 A; 105/367; 220/1.5, 97 R; 294/67.4–67.4 C; 280/33.99 T

[56] References Cited

UNITED STATES PATENTS

| 1,103,689 | 7/1914 | Russell | 220/97 X |
| 2,974,999 | 3/1961 | Stuart | 296/1 A X |
| 3,459,326 | 8/1969 | Betjemann | 220/1.5 |

FOREIGN PATENTS OR APPLICATIONS 335,839  3/1959  Switzerland ..........................214/10.5

Primary Examiner—Gerald M. Forlenza
Assistant Examiner—Frank E. Werner
Attorney—David Rabin

[57] ABSTRACT

A wheeled cargo carrier adapted for over-the-road travel as well as for stacking interchangeably with other cargo carriers aboard a ship includes a single or a plurality of adjustable ramps for supporting a number of vehicles thereon. The irregular shaped frame of the carrier includes supports displaceable from a retracted position when the carrier is adapted for over-the-road use, to extended positions for defining a stackable unit when the carrier is to be stored aboard a ship.

9 Claims, 7 Drawing Figures

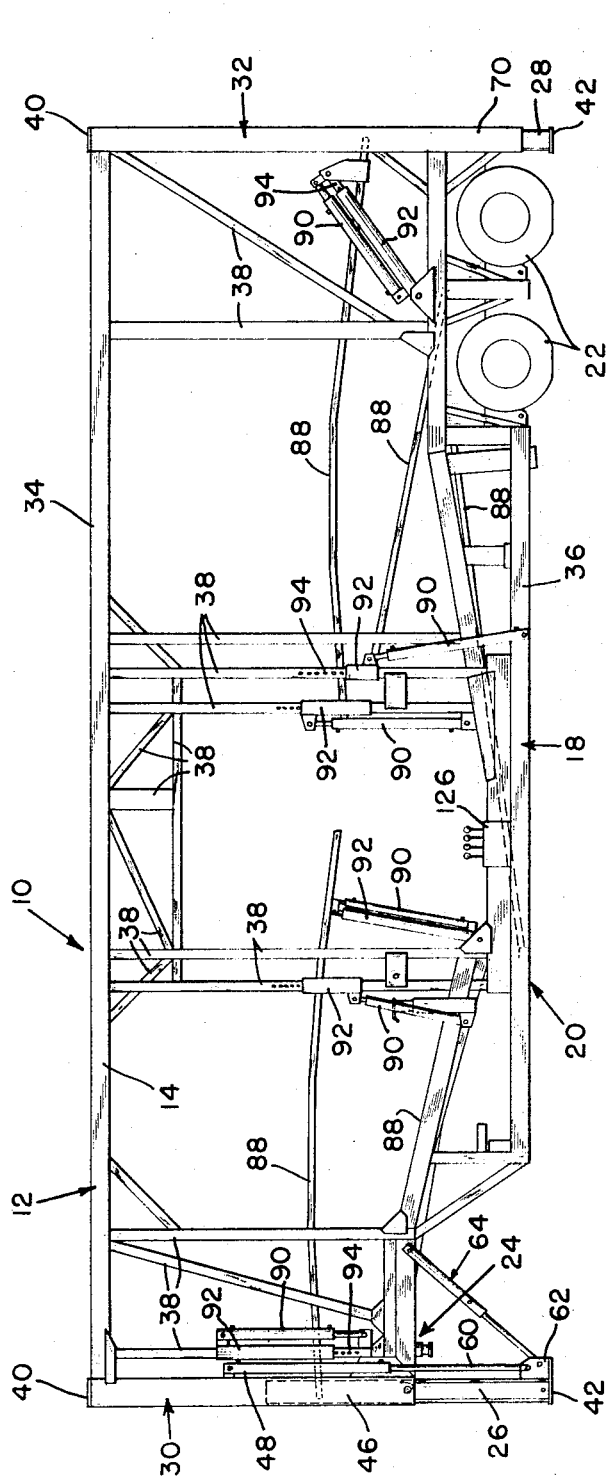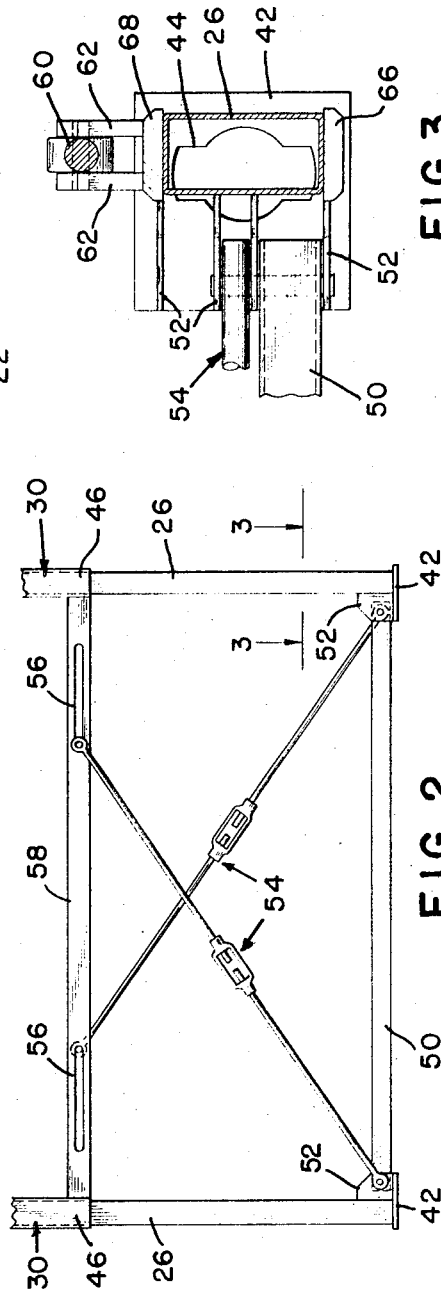
INVENTOR
BERT A. BODENHEIMER

INVENTOR
BERT A. BODENHEIMER

VEHICLE CARRIER

BACKGROUND, BRIEF SUMMARY, AND OBJECTS OF THE INVENTION

The development of land and sea transportation systems has resulted in the concept of cargo containers removably mounted on tractor-trailer truck beds and/or railway cars for land transportation to a port for loading the removable containers aboard a ship. The containers are then transported by ship to another port, unloaded and repositioned aboard a railway car or truck for delivery to a desired location.

The containers, which are capable of being stacked in superposed relation upon each other within the ship's hold or upon the deck of large seagoing vessels, are disclosed, for example, by U.S. Pat. Nos. 3,044,653 and 3,085,707. The containers are provided with corner posts, each having upper and lower coupling members for facilitating the interlocking of the containers with gantry cranes or other suitable lifting means, as disclosed in U.S. Pat. Nos. 3,042,227 and 3,027,025, for transferring the containers between land vehicles and marine vessels, and to facilitate the securing together of the containers in stacked relation.

Suitable cell guide systems may be provided on deck and/or within the hold of a ship as disclosed in copending application Ser. No. 745,476, filed 17 July 1968, and application Ser. No. 843,532, filed 22 July 1969, so that the containers may be stacked in tiers and maintained in storage position during movement of the ship at sea.

In the transportation of automobiles and other vehicles, closed box-like containers for accommodating four vehicles therein in end-to-end and stacked relation have been developed, as disclosed in copending application Ser. No. 833,532, filed on 16 June 1969. The containers for transporting vehicles are provided with support posts that can be aligned with other vehicle containers or standard freight containers so that the containers can be stacked upon a ship in superposed relation. In addition, the vehicle containers can be transferred between ship and shore by utilizing existing lifting systems. Such containers are adequate for the transportation of four vehicles. However, the vehicles are subject to damage as they are moved into and out of the closed containers. In addition, the cost of the containers is relatively expensive, and the containers must be transferred to and from truck chassis for movement to various destinations. Another disadvantage of the car containers is the extended length which restricts its utilization to above deck storage only.

The present invention relates to an over-the-road car or vehicle carrier that may be stacked in intermixed relation with standard box-type containers and/or other car carriers aboard a ship. The car carrier includes an open framework, an underframe including a lowered center section, wheels and wheel suspension, a fifth wheel arrangement for coupling to a conventional truck-tractor, and adjustable vehicle support ramps similar to those provided in conventional over-the-road car hauling equipment, which are commonly known as convoys.

Heretofore, it has been a requirement that the basic shape of a cargo carrying unit or container be rectangular in shape so as to be capable of being stacked with other containers in superposed relation aboard a ship. Since the basic shape of a car carrier of the present invention would be irregular due to the wheel arrangement and the means for permitting the carrier to be coupled to a standard truck tractor, the carrier is provided with a displaceable means, preferably supported on the carrier, for permitting the carrier to assume the necessary configuration for interchangeable stacking with other containers or carriers.

While the carrier may vary in length, in the preferred embodiment, the unit is approximately 35 feet long permitting not only stacking but locking of the unit to stacking frames or movable bulkheads mounted on a ship. The combination of standard size cars, compact cars, vans and trucks capable of being carried by the unit may vary depending upon the particular vehicles and the positions of the adjustable vehicle supporting ramps. For example, three large cars and two compact cars can be transported in a single carrier unit. The same unit can readily accommodate five standard size cars with a load overhang of one to 1½ feet at the ends of the carrier.

Thus the present invention provides for a vehicle carrier that can be coupled to a standard truck-tractor for over-the-road use and also be placed aboard a ship for marine transportation. Support posts, including displaceable portions, are provided at the upper and/or lower corners of the carrier for lifting by a crane spreader and for locking the carrier in stacked relation. For above deck storage, a protective cover including roof and side panels is placed over the carrier for protecting the vehicles.

One of the primary objects of the invention is a wheeled cargo carrier for over-the-road use that can be stacked aboard a ship with other carriers or containers.

Another object of the invention is the provision of a cargo carrier of irregular shape or configuration capable of assuming a rectangular or other required shape for interchangeable stacking with other containers.

Still another object of the invention is a car carrier provided with conventional coupling arrangements permitting the carrier to be transferred between ship and shore by conventional lifting means and permitting the carrier to be locked in stacked relation with other carriers.

A further object of the invention is a car carrier for transporting various combinations of vehicles within the confines of the carrier frame.

One feature of the invention is the provision of an open framework carrier providing maximum loading and unloading clearances thus reducing cargo damage.

Another feature of the invention is the provision of a vehicle carrier permitting vehicles to be loaded thereon at the point of manufacture, transported aboard a ship and delivered to destinations without unloading or reloading of the carrier at port facilities.

Still another feature of the invention is the provision of a car carrier which eliminates the requirement for special loading ramps, car inspections and car storage space at the port facilities.

Other objects and advantages of the invention will become readily apparent during the course of the following detailed description taken in conjunction with the accompanying drawings in which like characters of reference designate corresponding parts throughout the several views of the preferred embodiments which are illustrated without any restrictions or limitations intended.

BRIEF DESCRIPTION OF THE FIGURES IN THE DRAWINGS

FIG. 1 is a schematic side elevational view of one embodiment of the vehicle carrier of the present invention with the vehicle carrier-mounted displaceable supports in the operative positions;

FIG. 2 is a fragmentary, enlarged front elevational view of the vehicle carrier;

FIG. 3 is a view taken along section line 3—3 of FIG. 2;

DETAILED DESCRIPTION OF THE INVENTION

Figure 7:
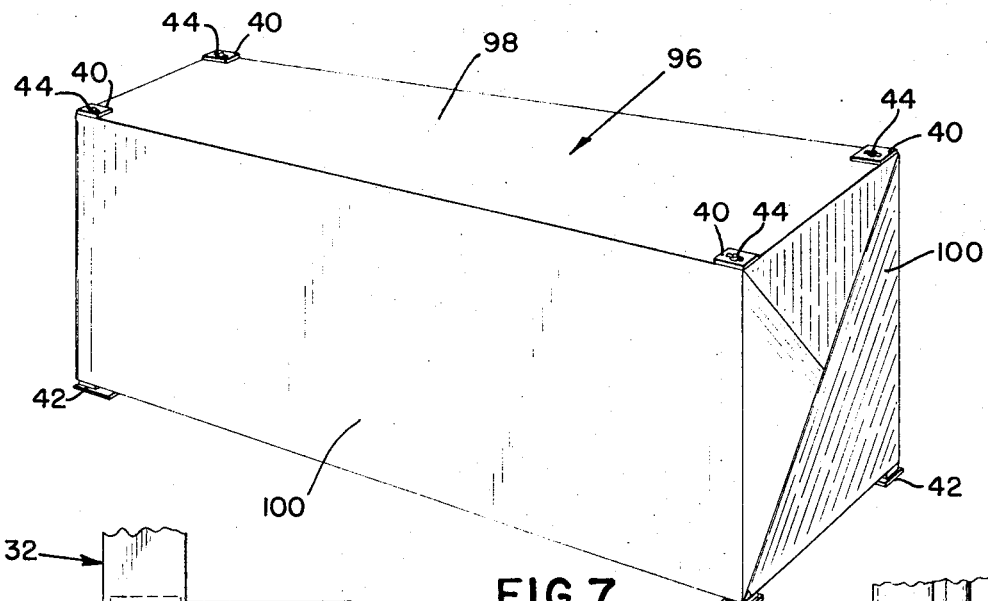
FIG. 7 is a perspective view of the vehicle carrier having a protective covering positioned thereon.

Referring to the drawings and particularly to FIG. 1, the cargo or vehicle carrier 10 includes a frame 12 consisting of a pair of truss-type side sections 14, 14, only one of which has been shown, maintained in spaced, parallel relation upon the base or chassis 18 which has a lowered central section 20. The frame 12 has wheels 22 and a fifth wheel arrangement 24 secured thereto which are carried with the frame at all times enabling the cargo carrier to be coupled to a conventional truck-tractor for over-the-road use. Displaceable members 26 and 28 at the forward and rearward ends, respectively, of the carrier and constituting portions of the support posts 30 and 32, permit the carrier 10 to be lifted by a conventional lifting means and transferred aboard a ship for stacking interchangeably with other cargo carriers including the box-like containers. A plurality of ramps or trucks are adjustably positioned at various heights above the base 18 and intermediate the side sections 14, 14 for supporting a number of vehicles thereon.

The ramps are positioned to support the optimum number of vehicles thereon, the particular number depending upon the types and sizes of the vehicles. For example, a carrier of 35 feet in length can carry four standard size cars or vans, or three standard size cars and two compact cars within the confines of the frame. The same carrier 10 can easily accommodate five standard size automobiles provided a load overhand of 1 to 1½ feet is permitted at each end of the carrier, which is a standard practice in over-the-road convoys. While this load overhang would preclude stacking of the carriers in cells below the deck of a ship, the carriers can be conveniently stacked on the ship's deck.

Each of the frame side sections 14 includes upper and lower rails 34 and 36 secured in position by a plurality of vertical and diagonal braces 38. The forward corner post 30, and the rearward corner post 32, positioned at the forward and rearward ends of each frame structure 14, have steel castings 40 and 42 secured thereto at the upper and lower ends thereof. The posts 30, 32 and castings 40, 42 are designed to receive the full load of all cargo containers or carriers mounted thereabove in stacked relation.

The castings 42 secured to the lower ends of the displaceable portions 26 and 28 of posts 30 and 32, respectively, extend to a horizontal plane lower than the wheels 22 or any other part of the carrier so that they alone will make contact with the upper or top castings or a subjacent carrier or container in a stack. Openings or sockets 44 are provided in each of the lower castings 42 for receiving coupling means for securing the carrier in place with respect to a ship or container mounted therebelow. The upper castings 40 are similarly provided with sockets 44, see FIG. 7, to facilitate the interlocking of lifting lugs of conventional lifting systems, as disclosed in U.S. Pat. No. 3,027,025, for transferring the cargo carrier to and from a ship, or to facilitate securing together the containers in stacked relation.

The displaceable portions 26 and 28 are moved to an operative position, as shown in FIG. 1, such that the lower castings 42 form with the upper castings 40, a carrier unit having an external configuration capable of being stacked. The stackable carrier unit corner castings 40 define with the extended corner castings 42 support points that are arranged in a regular parallelogram or parallelepipedal configuration, as shown by FIG. 7. While the castings and support posts have been shown positioned at the corners of the carrier, it is to be understood that the castings and support posts may be positioned inwardly of the corners as disclosed in copending application Ser. No. 831,057, filed 6 July 1969, and Ser. No. 833,521, filed 16 June 1969.

Figure 4:
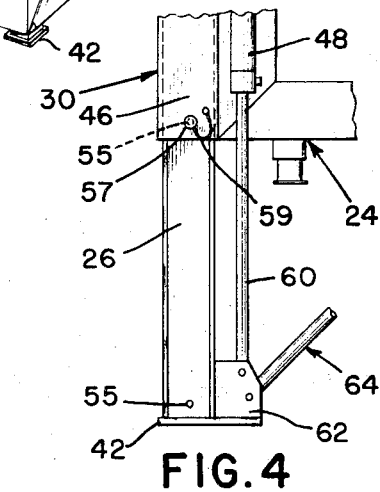
FIG. 4 is a fragmentary, side elevational view of one of the displaceable supports at the forward end of the vehicle carrier.

Referring to FIGS. 2–4 of the drawing, the displaceable portions 26 of the forward corner supports 30 are slidably received within the fixed tubular portions 46 and shifted by double acting fluid cylinders 48. The spaced telescoping portions 26 are interconnected at the lowermost ends by a member 50 secured at the ends thereof by brackets 52 to the tubular portions 46. Adjustable linkage mechanisms 54, each having the lower end pivoted to a bracket 52 and the upper end slidably receivable within a slot 56 provided in a brace 58 which is secured between the fixed portions 46 of posts 30, are used in tension thus transferring any side loads from one post 30 to the other by means of the horizontal member 50.

Each fluid cylinder 48 is secured to the respective side section 14 of frame 12 and has the rod 60 secured to a bracket 62 mounted immediately above the casting 42. A telescoping tube assembly 64 is provided for each displaceable portion 26 and has the ends thereof pivotally secured to the frame 12 and the bracket 62.

Vertically disposed stainless steel bars 66, 68 are disposed on opposed sides of each portion 26 and serve as bearing and guide surfaces for the portions 26 as they telescope within the tubular portions 46 of posts 30. A rack and rack gear arrangement, not shown, may be provided for simultaneously directing the movement of the spaced displaceable portions 26 in a smooth and efficient manner.

Upon retraction of the extended portions 26, by fluid cylinders 48, the upper ends of the adjustable linkage mechanisms 54 slide within openings 56 permitting the mechanisms 54 to collapse such that substantially the entire portions 26 can be telescopically received within tubular post portions 46.

Openings 55 are provided in each of portions 26 and 46 of the posts 32 for cooperatively receiving a pin 57 for locking the displaceable portions in retracted or extended positions. The pin 57 is attached to the post 32 by a flexible member 59.

As an alternative, the double acting cylinders 48 and 74 could be located within the corner posts 30 and 32 to prevent damage thereto. The cylinder and the piston rods would be connected between the stationary member and the displaceable member of each post.

Each of the rear support posts 32 includes the extensible and retractable portion 28, telescopically receivable within stationary portion 70, in a manner similar to the forward supporting post 30. The lowermost end of each displaceable portion 28, having castings 42 mounted thereon, also has a bracket 72 secured thereto. A fluid cylinder 74, having the piston rod 73 secured to bracket 72, is attached to the frame 12 by a bracket 76. Openings 78 and 80 are provided and the stationary and displaceable portions 70 and 28, respectively, of each rear post 32 for cooperation with a removable pin 82 to lock the displaceable portion 28 either in extended or retracted positions. The pins 82 may be attached to the posts 32 by a flexible chain 84 or other suitable means and inserted through aligned openings 78, 80 for maintaining the displaceable members 28 in the selected position.

Figure 5:
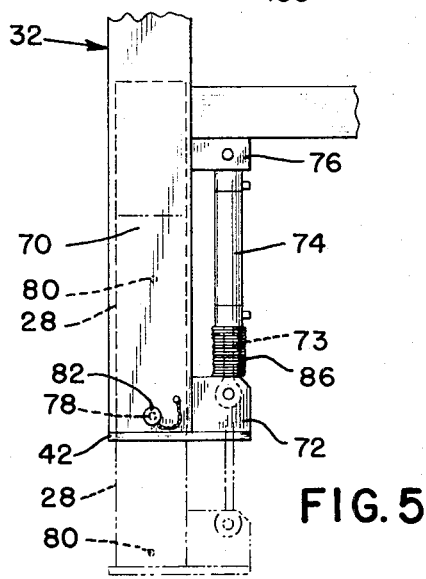
FIG. 5 is a fragmentary, enlarged elevational view of one of the displaceable supports at the rear of the vehicle carrier.

Referring to FIG. 5, the rod 73 of piston 74 is enclosed within an accordion or bellows-type boot 86 for protecting the piston rod. While the boot has been illustrated only on one of the fluid cylinders positioned for cooperation with one of the rear support posts 32, it is to be understood that in the preferred embodiment, all fluid cylinders, including the ramp-adjusting cylinders and the cylinders for displacing the lower portions of the front posts, also would be provided preferably with suitable protective boots.

Provided on the carrier 10, between the spaced side sections 14, 14 of the frame, is a plurality of adjustable ramps or tracks 88 for supporting a plurality of vehicles thereon. Double-acting fluid cylinders 90 are provided at either one end or both ends of the ramps 88 for displacing the ramps to selected positions for affording maximum loading and stacking of the vehicles on the carrier. The cylinders allow accurate control and smooth track action. Although not shown, the vehicles would be secured upon ramps 88 by suitable means usually employed with conventional over-the-road convoys. The cylinders 90 cooperate with telescopic tube stabilizers 92 for locking the ramps in the desired positions and for providing maximum in transit load stability. Pins or other suitable means, not shown, cooperate with the openings 94 in the telescopic tube stabilizers 92 for locking the ramps in selected positions.

For below deck storage of the containers within the hold of a ship, a protective covering normally would not be required for the cargo carrier. However, for above deck loading a removable cover of canvas or polyethylene would normally be utilized. As shown by FIG. 7, the covering 96 includes a roof 98 and side panels or curtains 100 provided on the four exposed sides of the carrier. The cover 96 is designed to permit exposure of the castings 40, 42 so as not to impede lifting and stacking of the carriers. The cover, which may be constructed of various suitable materials, is supported in such a manner that it does not physically contact or damage the vehicles positioned within the carrier.

Figure 6:
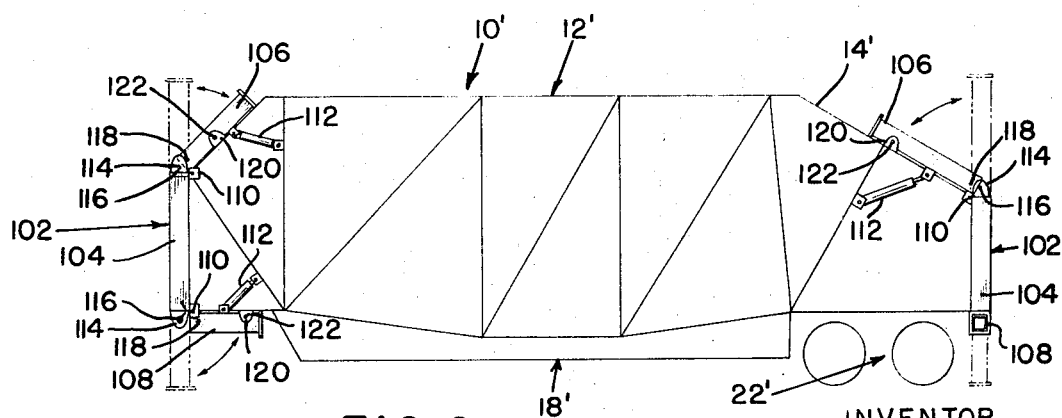
FIG. 6 is a schematic, side elevational view of a modified embodiment of a vehicle carrier of the present invention.

Referring to FIG. 6, a modified embodiment of the car carrier is illustrated wherein displaceable members are provided at the upper and lower portions of the frame 12'. The frame includes horizontally spaced side sections 14', a base 18', and a wheel assembly 22' somewhat similar to the carrier of FIG. 1. However, each of the load supporting corner posts 102 consists of a stationary central section 104 and upper and lower displaceable end portions 106, 108 pivotably secured as at 110 on the frame 12'. Double acting hydraulic cylinders 112 displace the end portions 106 and 108 between operative and inoperative positions. The lower section 108 of each rear post is pivoted transversely of the carrier frame by a cylinder, not shown, similar to the cylinders 112.

Plates 114, having openings 116 therein, are secured to the post central sections 104 for alignment with openings 118 provided in the pivoted end portions. A pin, not shown, may be inserted through the aligned openings 116, 118 to lock the pivoted portions in operative positions with respect to the stationary sections of the post. Plates 120, having openings 112 therein, are secured to the frame for locking the pivoted portions in inoperative positions. Although not illustrated, the carrier 10' would be provided with adjustable ramps, and telescopic tube stabilizers coupled with double acting hydraulic cylinders, etc., similar to the carrier illustrated in FIG. 1. The cargo carrier 10' could be provided with a covering 96 similar to the covering shown in FIG. 7.

While all fluid cylinders would be controlled from a central control means 126 mounted on frame 12, for clarity, the fluid lines extending between the control means and each of the double-acting cylinders have not been shown.

The means for locking the vehicle-supporting ramps 88 and displaceable post members 26, 28 or 106, 108 include pins manually positionable within aligned openings. However, it is to be understood that the pins may be spring-biased into locking positions, and capable of being retracted by fluid cylinders or other means simultaneously with the raising or lowering of the displaceable post members upon actuation of the fluid control means 126.

The car carrier of the present invention enables vehicles to be loaded upon the carrier at the point of manufacture and coupled to a conventional truck-tractor for over-the-road transport to a particular port for loading aboard a ship. Before the vehicle carrier is lifted aboard ship, the displaceable supports are locked in the extended positions such that the carrier can be interchangeably stacked with other carriers. Upon arrival of the ship at its destination, the carrier is transferred from the ship where it is coupled to a truck-tractor for transportation to its final destination, after the extended supports have been retracted and locked in the inoperative positions.

I claim:

1. Cargo handling apparatus comprising a body for stacking interchangeably in superposed relation with other cargo carriers, said body including a frame having an irregular external configuration, means on said frame displaceable between operative stacking and inoperative non-stacking positions for self-supporting the carrier in the operative stacking position, said displaceable means forming with said frame, support points at predetermined locations on said body, said support points, in said operative stacking position, being arranged in a configuration defining a stackable unit for mounting on a surface and for supporting a load thereabove, and means on said support points for facilitating lifting of said body, and supporting of said body in stacked relation.

2. Cargo handling apparatus as defined in claim 1, further including means for moving said displaceable means between said operative and said inoperative positions and for maintaining said displaceable means in said positions.

3. Cargo handling apparatus as defined in claim 1, wherein said displaceable means are supported adjacent the uppermost and lowermost portions of said frame and project to horizontal planes above and below said frame.

4. Cargo handling apparatus as defined in claim 1, said frame further including fixed support posts, said displaceable means including support members coupled to said fixed support post, and means for releasably securing said post and said support members in selected positions.

5. Cargo handling apparatus as defined in claim 1, wherein said displaceable means includes a plurality of support members pivotably secured to said frame, and means for displacing said members between said operative and said inoperative positions.

6. Cargo handling apparatus as defined in claim 1, wherein said displaceable means cooperates with said frame to define supporting posts while in said operative positions for supporting other cargo containers positioned thereabove.

7. Cargo handling apparatus as defined in claim 1, wherein said body comprises a cargo carrying vehicle for coupling to a conventional truck-tractor for over-the-road travel.

8. Cargo handling apparatus as defined in claim 7, said cargo carrying vehicle including a plurality of vehicle supporting ramps mounted upon said frame, and means for adjustably positioning said ramps in selected positions.

9. Cargo handling apparatus as defined in claim 7, said cargo carrying vehicle including means for coupling said vehicle to a conventional truck-tractor.

* * * * *